US 9,191,951 B2

(12) United States Patent
Takeda et al.

(10) Patent No.: US 9,191,951 B2
(45) Date of Patent: Nov. 17, 2015

(54) RADIO COMMUNICATION SYSTEM FOR OPTIMAL CFI CONTROL IN A CROSS-CARRIER SCHEDULING ENVIRONMENT

(75) Inventors: Kazuaki Takeda, Tokyo (JP); Nobuhiko Miki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 380 days.

(21) Appl. No.: 13/698,063

(22) PCT Filed: May 16, 2011

(86) PCT No.: PCT/JP2011/061245
§ 371 (c)(1),
(2), (4) Date: Jan. 10, 2013

(87) PCT Pub. No.: WO2011/145583
PCT Pub. Date: Nov. 24, 2011

(65) Prior Publication Data
US 2013/0107855 A1 May 2, 2013

(30) Foreign Application Priority Data

May 18, 2010 (JP) .................................. 2010-114382

(51) Int. Cl.
H04W 72/04 (2009.01)
H04L 5/00 (2006.01)
H04L 27/26 (2006.01)
(52) U.S. Cl.
CPC ........... *H04W 72/0453* (2013.01); *H04L 5/001* (2013.01); *H04L 5/0053* (2013.01); *H04W 72/0446* (2013.01); *H04L 5/0073* (2013.01); *H04L 27/2647* (2013.01)
(58) Field of Classification Search
None
See application file for complete search history.

(56) References Cited

U.S. PATENT DOCUMENTS

| | | | | |
|---|---|---|---|---|
| 5,946,622 | A * | 8/1999 | Bojeryd | 455/444 |
| 8,359,039 | B2 * | 1/2013 | McBeath et al. | 455/450 |
| 2011/0044259 | A1 * | 2/2011 | Nimbalker et al. | 370/329 |
| 2011/0070845 | A1 * | 3/2011 | Chen et al. | 455/91 |
| 2011/0076962 | A1 * | 3/2011 | Chen et al. | 455/68 |
| 2011/0081932 | A1 * | 4/2011 | Astely et al. | 455/509 |
| 2011/0103330 | A1 * | 5/2011 | Montojo et al. | 370/329 |
| 2011/0110441 | A1 * | 5/2011 | Chen et al. | 375/260 |
| 2011/0143796 | A1 * | 6/2011 | Lee et al. | 455/507 |
| 2011/0170496 | A1 * | 7/2011 | Fong et al. | 370/329 |
| 2011/0228732 | A1 * | 9/2011 | Luo et al. | 370/329 |

(Continued)

OTHER PUBLICATIONS

Motorolla, "Extension carrier operation", 3GPP TSG RAN WG1 Meeting #58bis, R1-093973, Miyazaki, Japan, Oct. 12-16, 2009 (2 pages).*
International Search Report issued in PCT/JP2011/061245 mailed on Jul. 26, 2011 (2 pages).

(Continued)

*Primary Examiner* — Dung B Huynh
(74) *Attorney, Agent, or Firm* — Osha Liang LLP

(57) ABSTRACT

In order to implement optimal CFI control under a cross-carrier scheduling environment and improve PDSCH transmission efficiency, for the MACRO_UE2 where the cross-carrier scheduling is employed, the PDSCH initiation position of CC1 that is used to transmit PDCCH is dynamically controlled, and the PDSCH initiation position of CC2 that is not used to transmit PDCCH is quasi-statically controlled. For the PICO_UE2 where the cross-carrier scheduling is employed, the PDSCH initiation position of CC2 that is used to transmit PDCCH is dynamically controlled, and the PDSCH initiation position of CC1 that is not used to transmit PDCCH is dynamically controlled.

3 Claims, 13 Drawing Sheets

(56) References Cited

U.S. PATENT DOCUMENTS

| | | | |
|---|---|---|---|
| 2011/0243066 A1* | 10/2011 | Nayeb Nazar et al. | 370/328 |
| 2011/0268032 A1* | 11/2011 | Kim et al. | 370/328 |
| 2011/0269492 A1* | 11/2011 | Wang | 455/509 |
| 2011/0274060 A1* | 11/2011 | Luo et al. | 370/329 |
| 2011/0286414 A1* | 11/2011 | Qu et al. | 370/329 |
| 2011/0299489 A1* | 12/2011 | Kim et al. | 370/329 |
| 2011/0317645 A1* | 12/2011 | Jen | 370/329 |
| 2012/0039179 A1* | 2/2012 | Seo et al. | 370/241 |
| 2012/0039180 A1* | 2/2012 | Kim et al. | 370/241 |
| 2012/0063302 A1* | 3/2012 | Damnjanovic et al. | 370/228 |
| 2012/0063321 A1* | 3/2012 | Chandrasekhar et al. | 370/241 |
| 2012/0263127 A1* | 10/2012 | Moon et al. | 370/329 |
| 2012/0294272 A1* | 11/2012 | Han et al. | 370/329 |
| 2012/0314674 A1* | 12/2012 | Seo et al. | 370/329 |
| 2012/0327783 A1* | 12/2012 | Moon et al. | 370/241 |
| 2013/0058291 A1* | 3/2013 | Ahn et al. | 370/329 |
| 2013/0094456 A1* | 4/2013 | Ng | 370/329 |
| 2013/0153298 A1* | 6/2013 | Pietraski et al. | 175/45 |
| 2013/0195071 A1* | 8/2013 | Ohta et al. | 370/330 |

OTHER PUBLICATIONS

CATR; "Standardized solution of PCFICH for cross-carrier scheduling"; 3GPP TSG RAN WG1 meeting #60bis, R1-102009; Beijing, China; Apr. 12-16, 2010 (3 pages).

NTT DOCOMO; "PCFICH for Cross-Carrier Assignment"; 3GPP TSG RAN WG1 Meeting #60bis, R1-102288; Beijing, China; Apr. 12-16, 2010 (4 pages).

NTT DoCoMo et al.; "Downlink L1/L2 Control Signaling Channel Structure: Coding"; 3GPP TSG RAN WG Meeting #47bis, R1-070103; Sorrento, Italy; Jan. 15-19, 2007 (17 pages).

3GPP TS 36.211 V0.2.1; "3rd Generation Partnership Project; Technical Specification Group Radio Access Network; Physical Channels and Modulation (Release 8)"; Nov. 2006 (24 pages).

Notification of Reasons for Rejection for Japanese Application No. 2010-114382 dated Jan. 22, 2013, with English translation thereof (7 pages).

3GPP TSG RAN WG1 Meeting #61, R1-103167; "PCFICH in Carrier Aggregation"; Motorola; Montreal, Canada, May 10-14, 2010 (7 pages).

* cited by examiner

| CIF | Number of Available CCs | | | |
|---|---|---|---|---|
| | 2 | 3 | 4 | 5 |
| 000 | CC1 | CC1 | CC1 | CC1 |
| 001 | CC2, CFI=1 | CC2, CFI=1 | CC2, CFI=1 | CC2, CFI=1 |
| 010 | CC2, CFI=2 | CC2, CFI=2 | CC2, CFI=2 | CC2, CFI=2 |
| 011 | CC2, CFI=3 | CC2, CFI=3 | CC2, CFI=3 | CC2, CFI=3 |
| 100 | N/A | CC3, CFI=1 | CC3, CFI=1 | CC3, CFI=N |
| 101 | N/A | CC3, CFI=2 | CC3, CFI=2 | N/A |
| 110 | N/A | CC3, CFI=3 | CC3, CFI=3 | CC5, CFI=N |
| 111 | N/A | N/A | CC4, CFI=N | CC4, CFI=N |

FIG. 11

RADIO COMMUNICATION SYSTEM FOR OPTIMAL CFI CONTROL IN A CROSS-CARRIER SCHEDULING ENVIRONMENT

TECHNICAL FIELD

The present invention relates to a radio communication system that notifies a data channel initiation position in a component carrier of a control channel on a communication system band widened by aggregating a plurality of fundamental frequency blocks (hereinafter, referred to as a "component carrier").

BACKGROUND ART

A communication scheme subsequent to wideband code division multiple access (W-CDMA) or high speed downlink packet access (HSDPA), that is, long-term evolution (LTE) has been established by a 3rd generation partnership project (3GPP) standardization group. In LTE, as a radio access scheme, orthogonal frequency division multiple access (OFDMA) is employed in downlink, and single-carrier frequency division multiple access (SC-FDMA) is employed in uplink.

In OFDMA, a frequency band is divided into a plurality of narrow frequency bands (subcarriers), and data are conveyed on each frequency band for transmission. Fast transmission is implemented by densely arranging subcarriers over frequencies without interference while they partially overlap with one another, so that it is possible to increase spectral efficiency.

In SC-FDMA, it is possible to alleviate interference between terminals by dividing the frequency band and transmitting signals using different frequency bands between a plurality of terminals. In SC-FDMA, since transmission power fluctuation is reduced, it is possible to reduce power consumptions in terminals and implement wide coverage.

The LTE system performs communication by causing a plurality of mobile stations (user equipment: UE) to share one or more physical channels in both uplink and downlink. The channel shared by a plurality of the mobile stations UEs is generally called a shared channel. In LTE, the shared channel is referred to as a physical uplink shared channel (PUSCH) in uplink and as a physical downlink shared channel (PDSCH) in downlink.

In the communication system using the shared channel described above, it is necessary to perform signaling regarding which mobile station UE the shared channel is allocated to in every subframe which is a unit of transmission time. The subframe may be referred as a transmission time interval (TTI).

In LTE, a physical downlink control channel (PDCCH) is defined as a downlink control channel used in the signaling described above. Furthermore, a physical control format indicator channel (PCFICH) is defined as a control channel for notifying the number of OFDM symbols used in PDCCH, and a physical hybrid-ARQ indicator channel (PHICH) is defined as a control channel for transmitting ACK/NACK information of the hybrid-ARQ for PUSCH.

The downlink control information carried on PDCCH includes, for example, downlink scheduling information, an uplink scheduling grant, an overload indicator, and a transmission power control command bit (Non-patent Literature 1). In addition, the downlink scheduling information includes, for example, downlink resource block allocation information, an identification of UE, the number of streams, information on precoding vectors, a data size, a modulation scheme, and information on a hybrid automatic repeat request (HARQ). In addition, the uplink scheduling grant includes, for example, uplink resource block allocation information, an identification of UE, a data size, a modulation scheme, uplink transmission power information, and information on a demodulation reference signal.

In the PCFICH, the number of OFDM symbols for PDCCH mapping is notified as control channel format information (control channel format indicator: CFI). In LTE, the number of OFDM symbols for PDCCH mapping is set to 1, 2, or 3. In addition, PDCCH is mapped from the leading end of the OFDM symbols in a single subframe (Non-patent Literature 2).

In downlink, a range corresponding to the CFI (number of OFDM symbols) notified on PCFICH from the leading end of the subframe becomes a control channel area allocated to PDCCH. The mobile station decodes the control channel area and further decodes a radio resource allocated to PDSCH based on the downlink control information if there is information destined to the mobile station itself.

CITATION LIST

Non-Patent Literature

Non-patent Literature 1: R1-070103, Downlink L1/L2 Control Signaling Channel Structure: Coding
Non-patent Literature 2: 3GPP TR 36.211 (V0. 2.1), "Physical Channels and Modulation," November, 2006

SUMMARY OF THE INVENTION

Technical Problem

Currently, in LTE-Advanced (hereinafter, referred to as "LTE-A") discussed in the 3GPP, it is agreed that a wideband is obtained by aggregating a plurality of component carriers. There may be a communication environment in which some component carriers suffer strong interference from other cells, but other component carriers suffer less interference. In this regard, a scheme has been proposed, in which allocation of downlink control information (DCI) regarding the shared data channel (PDSCH/PUSCH) carried on the component carrier suffering strong interference from other cells is performed using another component carrier less suffering interference. In this specification, the PDCCH of the component carrier used to transmit PDSCH is sent using a component carrier other than that component carrier, which will be referred to as cross-carrier scheduling.

The present invention provides a radio communication system capable of implementing optimal CFI control under a cross-carrier scheduling environment.

Solution to Problem

According to an aspect of the present invention, there is provided a radio communication system having a first base station that forms a first cell and a second base station that forms a second cell overlapping with at least a part of the first cell, wherein, in a case where communication between subordinate terminals is performed using a plurality of fundamental frequency blocks, the first base station transmits first resource information indicating a data channel initiation position in one of the fundamental frequency blocks, and second resource information indicating a data channel initiation position in the other fundamental frequency block through a control channel of the one of the fundamental frequency block, the first resource information is dynamically controlled, and the second resource information is quasi-statically controlled, and wherein, in a case where communication between subordinate terminals existing in positions where there is interference from the first cell within the second cell is performed using the one and the other fundamental frequency blocks, the second base station transmits third resource information indicating a data channel initiation position in the other fundamental frequency block and fourth resource information indicating a data channel initiation position in the one of the fundamental frequency block through a control channel of the other fundamental frequency block, and the third resource information and the fourth resource information are dynamically controlled.

Technical Advantages of the Invention

According to the present invention, it is possible to implement optimal CFI control under a cross-carrier scheduling environment and improve PDSCH transmission efficiency.

BRIEF DESCRIPTION OF THE DRAWINGS

FIG. 11 is configuration a diagram illustrating a joint coding table;

DESCRIPTION OF EMBODIMENTS

Figure 1:
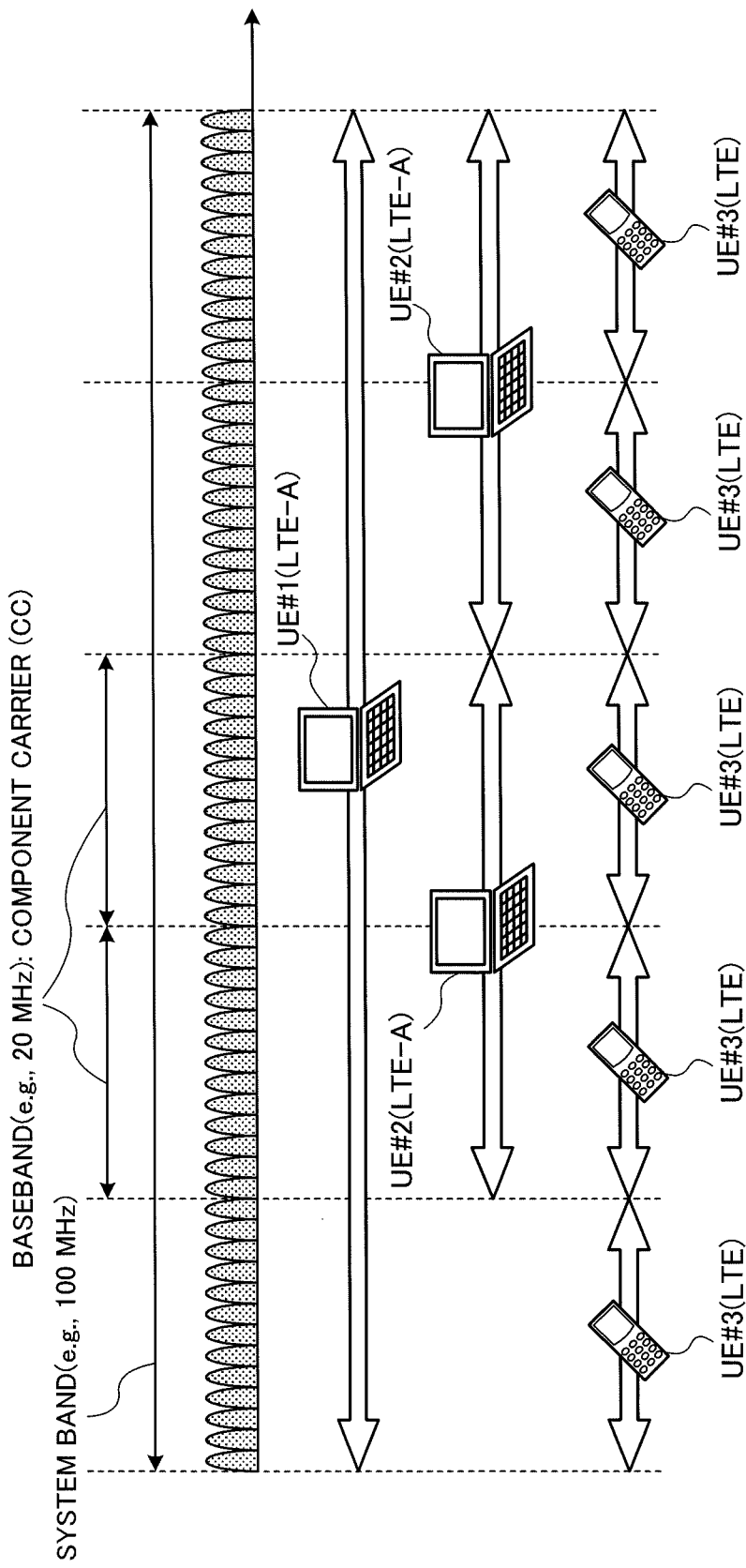
FIG. 1 is a diagram illustrating a layered bandwidth configuration defined in LTE-A.

FIG. 1 is a diagram illustrating a layered bandwidth configuration defined in LTE-A. The example of FIG. 1 illustrates a layered bandwidth configuration in a case where there are coexistently provided an LTE system as a first mobile communication system that performs radio communication using a variable system band and an LTE-A system as a second mobile communication system that performs radio communication using a variable system band in which the system band is switched by adding or reducing fundamental frequency blocks by using the system band of the first mobile communication system (e.g., maximum system band) as a basic unit (fundamental frequency block).

While the LTE-A system performs radio communication using a variable system bandwidth, for example, equal to or smaller than 100 MHz, the LTE system performs radio communication using a variable system bandwidth equal to or smaller than 20 MHz. The system band of the LTE-A system is at least a single fundamental frequency block by using the system band of the LTE system as a unit. In LTE-A, the fundamental frequency block is referred to as a component carrier (CC). Obtaining a wideband by combining a plurality of component carriers in this manner is called carrier aggregation.

For example, in FIG. 1, the system band of the LTE-A system may include five component carrier bands (20 MHz×5=100 MHz) by using the system band (baseband: 20 MHz) of the LTE system as a single component carrier. In FIG. 1, the mobile terminal apparatus UE#1 (User Equipment) complying with LTE-A (or LTE) system is capable of processing the system band up to 100 MHz. The mobile terminal apparatus UE#2 complying with LTE-A (or LTE) system is capable of processing the system band up to 40 MHz (20 MHz×2=40 MHz). The mobile terminal apparatus UE#3 complying with LTE (but not complying with LTE-A) system is capable of processing the system band up to 20 MHz (baseband).

Figure 2A:
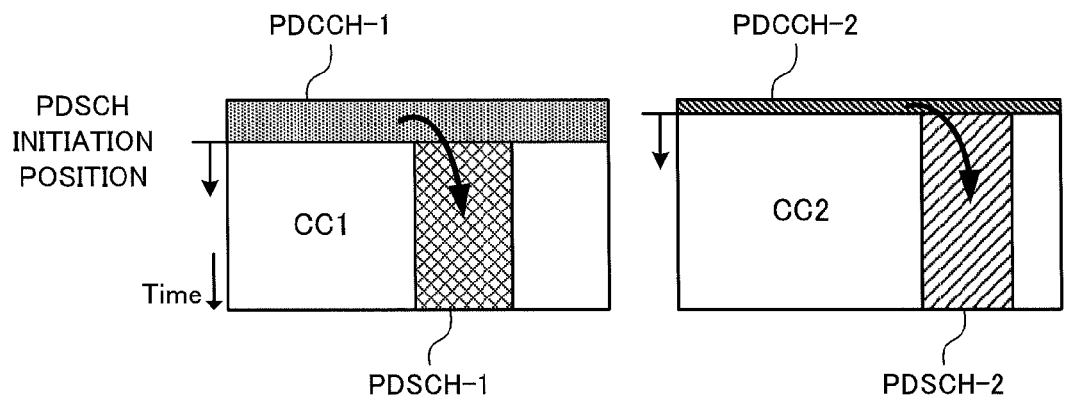
FIGS. 2A and 2B are conceptual diagrams illustrating a case where no cross-carrier scheduling is performed and a case where the cross-carrier scheduling is performed.
Figure 2B:
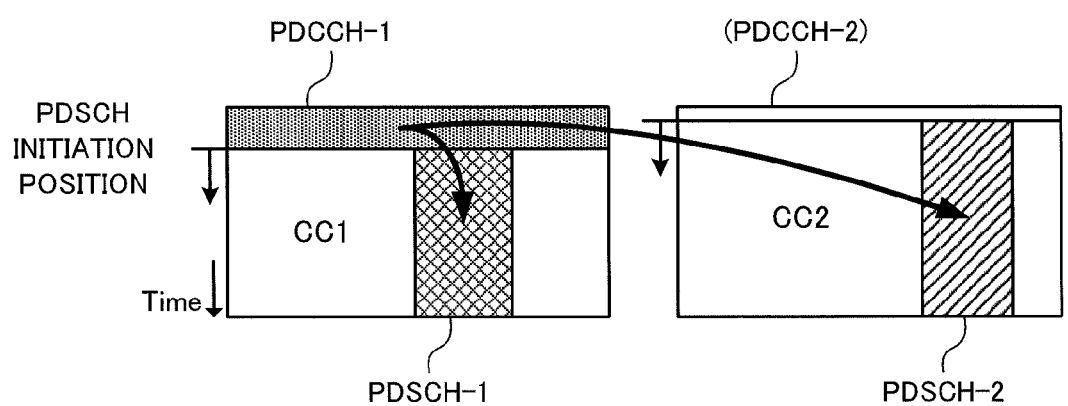

In radio communication with a system band widebanded in this manner, two methods illustrated in FIGS. 2A and 2B may be conceivable as a method of transmitting a downlink control channel for notifying information necessary in a traffic channel (for receiving PDSCH and transmitting PUSCH).

In the method illustrated in FIG. 2A, PDSCH and PDCCH used to demodulate the PDSCH are transmitted on the same component carrier. Specifically, PDSCH-1 is allocated to the component carrier CC1, and PDSCH-2 is allocated to a different component carrier CC2. PDSCH-1 containing control information for decoding the PDSCH-1 and the like is transmitted on the same component carrier CC1 as that of the PDSCH-1, and PDCCH-2 containing control information for decoding the PDSCH-2 and the like is transmitted on the same component carrier CC2 as that of the PDSCH-2. A user terminal obtains the control information of the PDSCH by decoding the PDCCH and decodes the PDSCH based on the control information.

In the method illustrated in FIG. 2B, cross-carrier scheduling is employed, in which the PDCCH of the component carrier used to convey DSCH is transmitted using another component carrier different from that component carrier. Specifically, the PDSCH-1 is allocated to the component carrier CC1, and the PDSCH-2 is allocated to another component carrier CC2. However, the PDCCH-2 for decoding the PDSCH-2 is transmitted on a component carrier CC1 different from that of the PDSCH-2.

Figure 3:
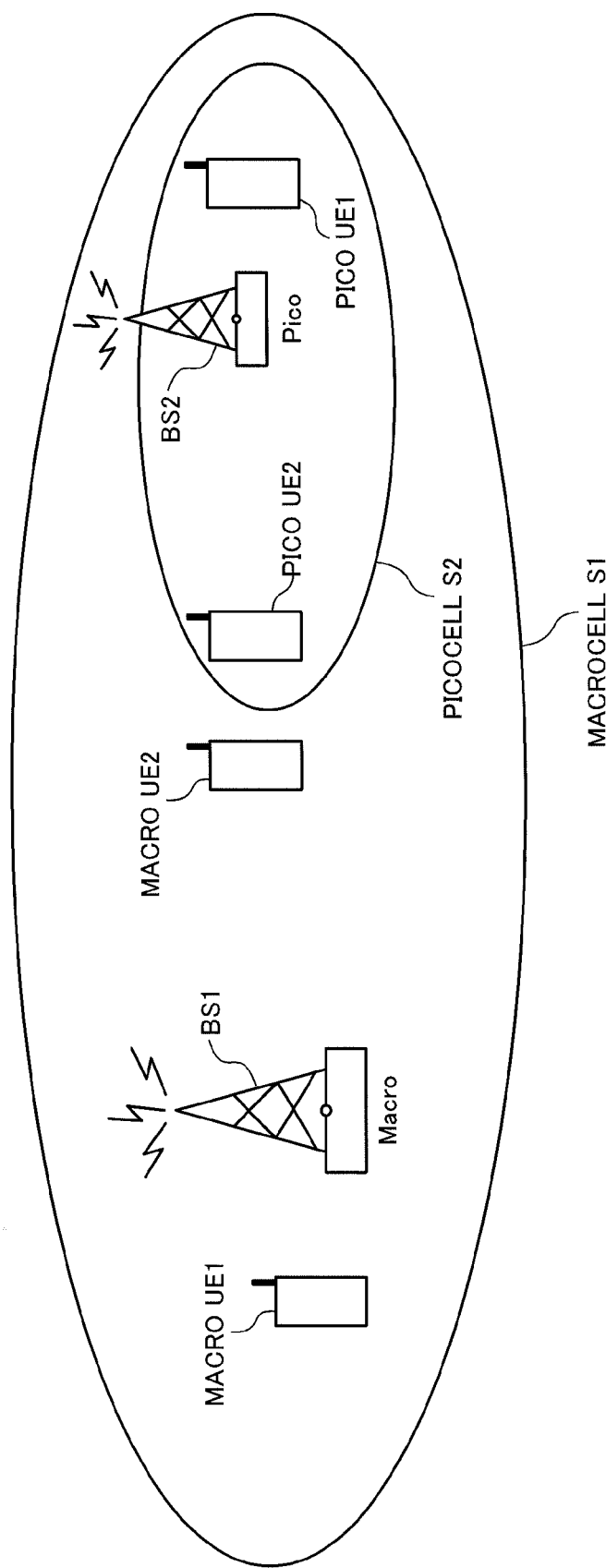
FIG. 3 is a conceptual diagram illustrating a relationship between a macrocell and a picocell.

In the cross-carrier scheduling, it is assumed that macro UEs and pico UEs mixedly exist. FIG. 3 is a conceptual diagram in which a macrocell S1 having a wide coverage area and a picocell S2 having a local coverage area are mixedly arranged. It is known that the entire throughput can be improved by arranging the picocell S2 in a part of the macrocell S1 (for example, under a coarse radio wave environment) as illustrated in FIG. 3.

A macro base station BS1 forms a macrocell S1, and macro user equipments MACRO_UE1 and MACRO_UE2 serving as user terminals exist in coverage of the macro base station BS1. A pico base station BS2 forms a picocell S2, and pico user equipments PICO_UE1 and PICO_UE2 serving as user terminals exist in coverage of the pico base station BS2. While one of the macro user equipments MACRO_UE1 is placed in the vicinity of the base station BS1, the other macro user equipment MACRO_UE2 is placed near the cell edge of the picocell S2. In addition, while one of the pico user equipments PICO_UE1 is placed in the vicinity of the base station BS2, the other pico user equipment PICO_UE2 is placed near the cell edge of the picocell S2. Under such a condition, it is anticipated that the PICO_UE2 near the cell edge of the picocell S2 suffers significant interference from the macro (MACRO_UE2 and the macro base station BS1). If the cross-carrier scheduling is applied to the MACRO_UE2 and the PICO_UE2, it is possible to significantly alleviate interference from the macro to the PICO_UE2.

Figure 4A:
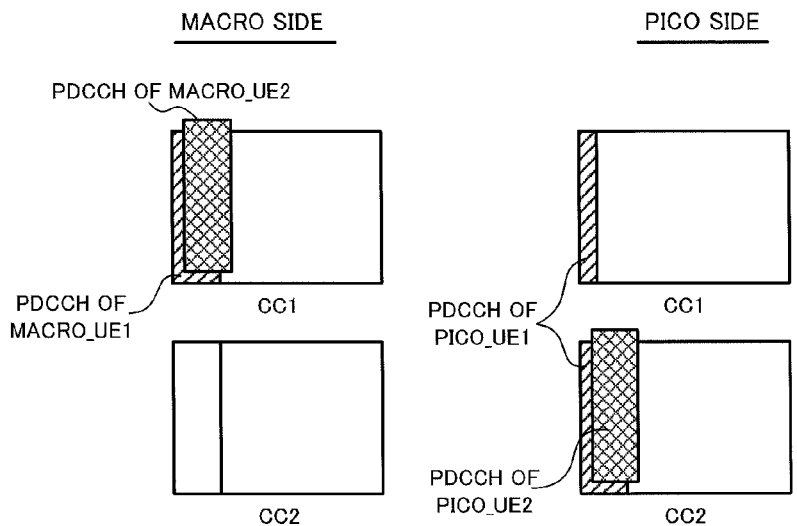
FIGS. 4A to 4C are diagrams illustrating PDCCH allocation for a macro UE and a pico UE.

FIG. 4A is a conceptual diagram in which the cross-carrier scheduling is applied to PDCCH of the MACRO_UE2 and the PICO_UE2. Although the macro UE and the pico UE use the same system band, the system band is illustrated separately for the macro UE and the pico UE. In addition, FIG. 4A illustrates a case where two component carriers CC1 and CC2 are allocated to MACRO_UE1, MACRO_UE2, PICO_UE1, and PICO_UE2.

Figure 4B:
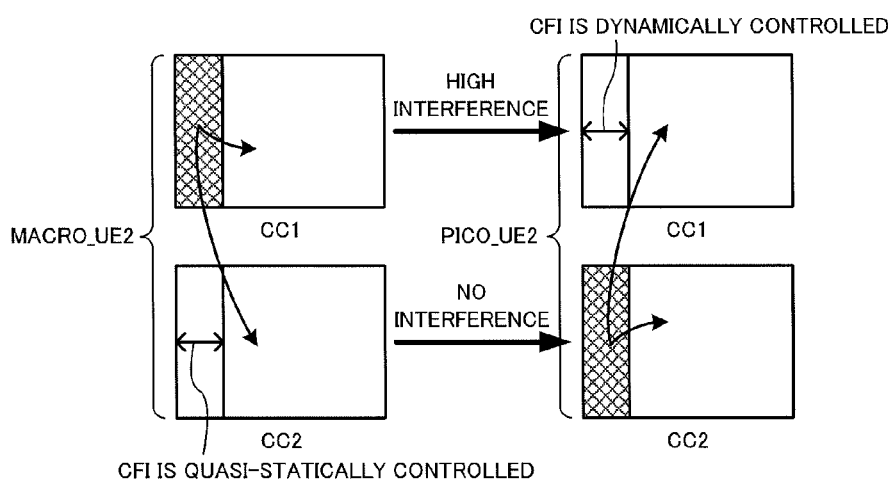

As illustrated in FIG. 4B, the cross-carrier scheduling for the MACRO_UE2 is performed such that CFI indicating the PDSCH initiation positions of CC1 and CC2 is notified from the PDCCH of CC1. The cross-carrier scheduling for the PICO_UE2 is performed such that CFI indicating the PDSCH initiation positions of CC1 and CC2 is notified from the PDCCH of CC2. As a result, the PICO_UE2 can receive the CFI of CC1 and CC2 using the PDCCH of CC2 that does not suffer interference from the macro.

Figure 4C:
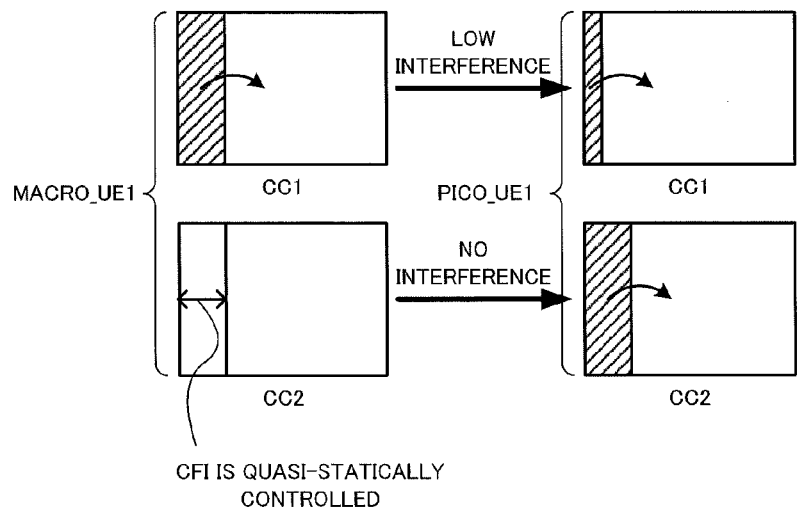

As illustrated in FIG. 4C, the cross-carrier scheduling for the MACRO_UE1 is performed such that CFI indicating the PDSCH initiation positions of CC1 and CC2 is notified from the PDCCH of CC1, so that interference to the pico UE is suppressed. Meanwhile, since the PICO_UE1 exists in the vicinity of the pico base station BS2, the interference from the macro is small compared to a desired signal from the pico base station BS2. In addition, since the interference of the PICO_UE1 to the macro UE is small even when the PDCCH of CC1 is used, the necessity of cross-carrier scheduling is low. In FIG. 4A, a state of no cross-carrier scheduling is indicated for the PICO_UE1.

For the PICO_UE1, the PDSCH initiation position of CC1 is notified using CFI by the PDCCH of CC1, and the PDSCH initiation position of CC2 is notified using CFI by the PDCCH of CC2.

According to the present invention, for the MACRO_UE1 and the MACRO_UE2 where the cross-carrier scheduling is applied, the PDSCH initiation position of CC2 that is not used to transmit PDCCH is quasi-statically controlled. In addition, for the PICO_UE2 where the cross-carrier scheduling is applied, the PDSCH initiation position of CC1 that is not used to transmit PDCCH is dynamically controlled.

According to the present invention, since the PDSCH initiation position of CC1 that is not used to transmit PDCCH for the PICO_UE2 is dynamically controlled (for example, by controlling CFI for each subframe), it is possible to transmit the PDSCH of CC1 with high efficiency. In addition, since the PDSCH initiation position of CC2 that is not used to transmit PDCCH for the MACRO_UE1 and the MACRO_UE2 is controlled dynamically (for example, on a subframe basis) or quasi-statically (for example, with a period longer than that of the subframe), the PDSCH initiation position of CC2 of the MACRO_UE2 can be expedited depending on a condition of the picocell. As a result, it is possible to effectively transmit the PDSCH.

Figure 5A:
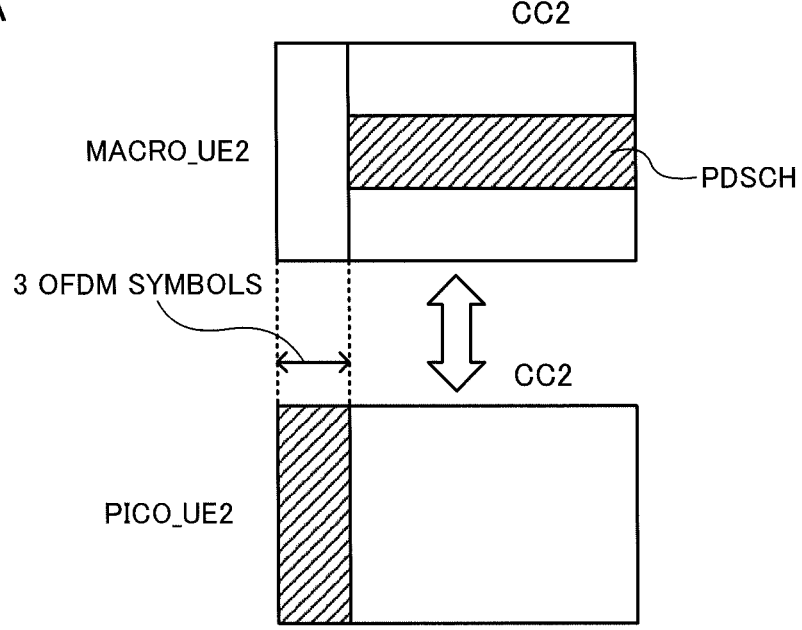
FIGS. 5A and 5B are diagrams for describing PDSCH transmission efficiency when CFI of the macro UE is controlled quasi-statically.
Figure 5B:
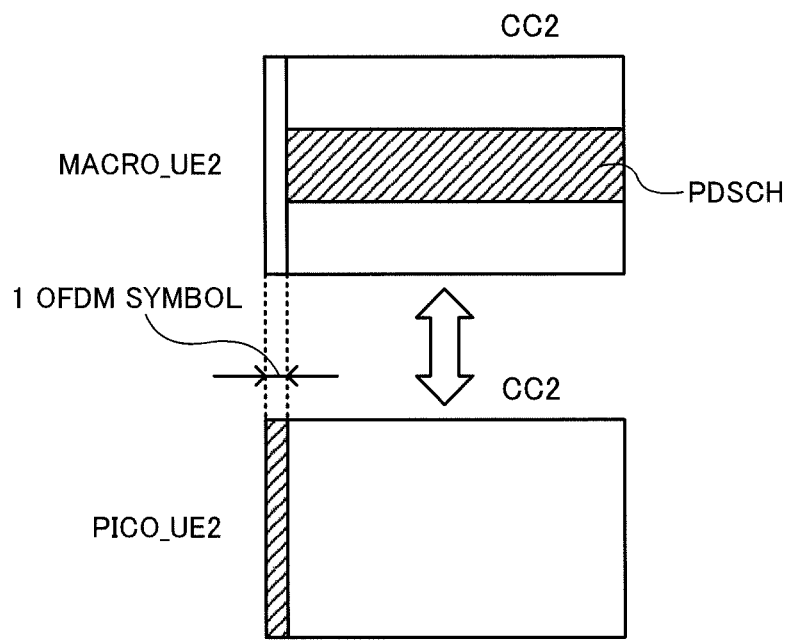

How to improve the PDSCH transmission efficiency by quasi-statically controlling the PDSCH initiation position of CC2 for the MACRO_UE2/PICO_UE2 will be described in detail with reference to FIGS. 5A and 5B. While there are a lot of UEs suffering significant interference from the macro base station, such as PICO_UE2, as illustrated in FIG. 5A, and three OFDM symbols are allocated to the PDCCH of CC2, the CFI for the MACRO_UE2 is quasi-statically controlled such that the PDSCH initiation position of CC2 does not overlap with the PDCCH of PICO_UE2 and initiates from the 4th OFDM symbol of the subframe.

Depending on an environment of the picocell S2 side, there is a time period for which it is not necessary to allocate three OFDM symbols to PDCCH of CC2. For example, in a case where the number of pico UEs subordinate to the pico base station BS2 of the picocell S2 is small, a single OFDM symbol (or two OFDM symbols) is sufficient for the PDCCH of CC2. In this case, as illustrated in FIG. 5B, since only a single OFDM symbol (or two OFDM symbols) are used for the PDCCH of CC2 to communicate with the PICO_UE2, the number of symbols for the PDSCH initiation position of CC2 used to communicate with the MACRO_UE2 can increase as many as two OFDM symbols (a single OFDM symbol when the PDCCH of PICO_UE2 is transmitted on two symbols). That is, the PDSCH initiation position of CC2 used to communicate with the MACRO_UE2 can be extended to the second or third OFDM symbol, compared to a case where the PDSCH initiation position of CC2 used to communicate with the MACRO_UE2 is fixed to the fourth OFDM symbol. Therefore, it is possible to improve PDSCH transmission efficiency.

Hereinafter, embodiments of the present invention will be described in detail with reference to the accompanying drawings. Here, description will be made for a case where a base station and a mobile station complying with the LTE-A system requirement are used.

Figure 6:
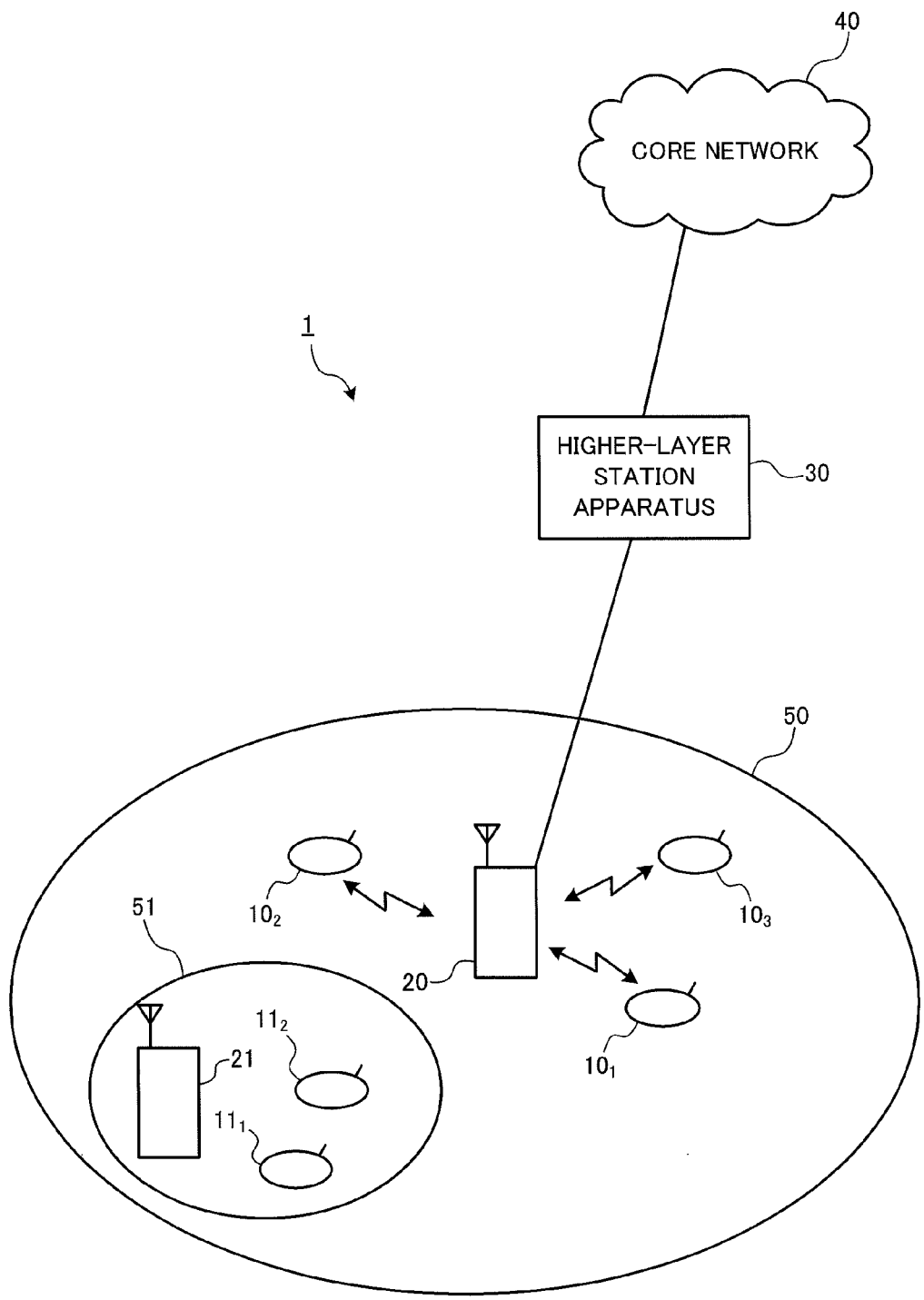
FIG. 6 is a diagram illustrating the entire mobile communication system according to an embodiment.

A mobile communication system 1 including mobile stations (UE) 10 and 11 and base stations (eNodeB) 20 and 21 according to an embodiment of the present invention will be described with reference to FIG. 6. FIG. 6 is a diagram illustrating a configuration of the mobile communication system 1 including the mobile stations 10 and 11 and the base stations 20 and 21 according to the present embodiment. The mobile communication system 1 illustrated in FIG. 6 is, for example, an LTE system or a SUPER-3G system. In addition, the mobile communication system 1 may be called an IMT-Advanced or 4G.

The mobile communication system 1 includes a base station 20 serving as a macro base station and mobile stations 10 ($10_1$, $10_2$, $10_3$, . . . ) serving as a plurality of macro mobile stations that communicate with the base station 20. The macro base station 20 is connected to a higher-layer station apparatus 30, which is connected to a core network 40. The macro mobile station 10 communicates with the macro base station 20 in the macrocell 50. In addition, the higher-layer station apparatus 30 may include, for example, but not limited to, an access gateway apparatus, a radio network controller (RNC), a mobility management entity (MME), and the like. A pico base station 21 that forms the picocell 51 having local coverage is arranged in a part of the macrocell 50. In the picocell 51, there are mobile stations 11 ($11_1$, $11_2$, . . . ) serving as pico mobile stations subordinate to the pico base station 21.

Since each mobile station $10_1$, $10_2$, $10_3$, . . . , and $10_n$ or $11_1$, $11_2$, . . . has the same configuration, function, and condition, the mobile station will be denoted by reference numeral 10 or 11 in the following description unless specified otherwise.

For convenient description purposes, it is assumed that the mobile station 10 or 11 wirelessly communicates with the base station 20 or 21. However, more generally, the mobile station may be called user equipment UE, including a fixed terminal apparatus.

As a radio access scheme in the mobile communication system 1, orthogonal frequency division multiple access (OFDMA) is employed in downlink, and single carrier frequency division multiple access (SC-FDMA) or clustered DFT-spread OFDM is employed in uplink. In OFDMA, a multiple carrier transmission scheme is employed, in which a frequency band is divided into a plurality of narrow frequency bands (subcarriers), and communication is performed by mapping data to each subcarrier. In SC-FDMA, a single carrier transmission scheme is employed, in which interference between terminals is alleviated by dividing a system band into bands including a single or a series of resource blocks for each terminal and causing a plurality of terminals to use different bands. In clustered DFT-spread OFDM, a group (cluster) of discontinuous clustered subcarriers are allocated to a single mobile station UE, and discrete Fourier transform spread OFDM is applied to each cluster, so that uplink multiple access can be implemented.

Here, communication channels in the LTE/LTE-A system will be described. In a downlink physical channel, PDSCH shared by each mobile station 10 or 11 and downlink control channels (such as PDCCH, PCFICH, and PHICH) are used. The downlink control channel may be referred to as an L1/L2 control channel. Using the PDSCH, user data (including a control signal of a higher layer), that is, a typical data signal is transmitted. The transmit data are included in this user data. In addition, the component carrier allocated to the mobile station 10 or 11 by the base station 20 or 21 may be notified to the mobile station 10 or 11 using the RRC signaling.

In uplink, the physical uplink shared channel (PUSCH) shared by each mobile station 10 or 11 and the physical uplink control channel (PUCCH) as an uplink control channel are used. Using this PUSCH, user data are transmitted. In addition, UL ACK/NACK, the downlink channel quality indicator (CQI), and the like are transmitted on the PUCCH.

Figure 7:
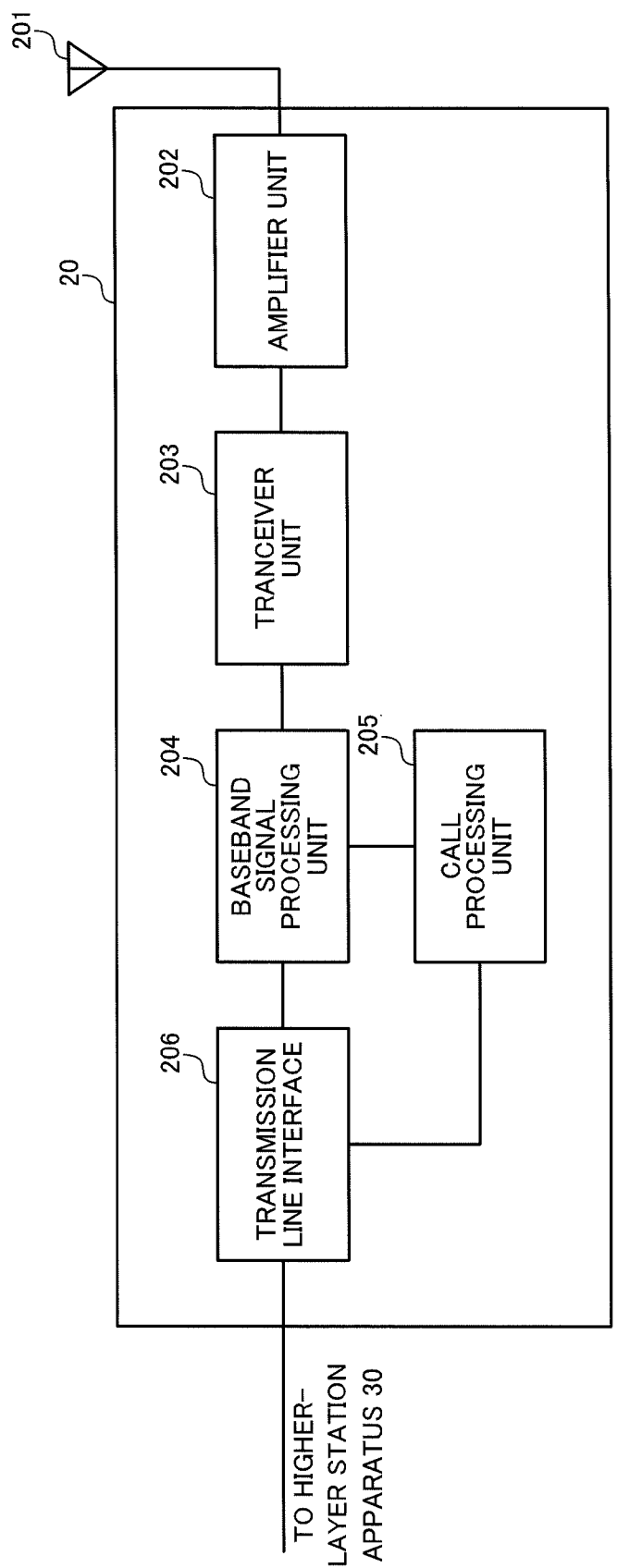
FIG. 7 is a schematic configuration diagram illustrating a base station apparatus according to an embodiment.

FIG. 7 is a schematic configuration diagram illustrating the macro base station 20 according to the present embodiment. A basic configuration of the pico base station 21 is similar to that of the macro base station 20, which has the elements illustrated in FIG. 7. Hereinafter, a configuration of the macro base station 20 will be described in detail, which will be similarly applied to the configuration of the pico base station 21.

The macro base station 20 includes a Tx/Rx antenna 201, an amplifier unit 202, a transceiver unit 203, a baseband signal processing unit 204, a call processing unit 205, and a transmission line interface 206.

The user data transmitted in downlink from the macro base station 20 to the mobile station 10 are input to the baseband signal processing unit 204 through the transmission line interface 206 from the higher-layer station apparatus 30 that is higher than the macro base station 20.

The baseband signal processing unit 204 performs a PDCP layer process such as sequence number allocation, user data partitioning/combining, a radio link control (RLC) layer transmission process such as a transmission process of RLC retransmission control, medium access control (MAC) retransmission control, for example, a HARQ transmission process, scheduling, transmission format selection, channel coding, an inverse fast Fourier transform (IFFT) process, and a precoding process and transmits the result to the transceiver unit 203. In addition, a transmission process such as channel coding or inverse fast Fourier transform is performed for the downlink control channel signal, and the resultant signal is transmitted to the transceiver unit 203.

In addition, the baseband signal processing unit 204 notifies the mobile station 10 of control information for communication in a cell 50 through a broadcast channel. The broadcast information for communication in a cell 50 contains, for example, a system bandwidth in uplink or downlink, identification information (root sequence index) on a root sequence for generating a random access preamble in PRACH, and the like.

The transceiver unit 203 performs a frequency conversion process for converting the baseband signal output from the baseband signal processing unit 204 to a radio frequency band, and then, the resultant signal is amplified by the amplifier unit 202 and is transmitted through the Tx/Rx antenna 201.

Meanwhile, the macro base station 20 receives the transmission waves transmitted by the macro mobile station 10 using the Tx/Rx antenna 201. The radio frequency signal received by the Tx/Rx antenna 201 is amplified by the amplifier unit 202, and the frequency conversion is performed by the transceiver unit 203, so that it is converted into a baseband signal, which is input to the baseband signal processing unit 204.

The baseband signal processing unit 204 performs a FFT process, an IDFT process, error correction decoding, a process for receiving of MAC retransmission control, and a process for receiving RLC and PDCP layers for the user data included in the input baseband signal, and transmits the resultant signal to the higher-layer station apparatus 30 through a transmission line interface 206.

The call processing unit 205 performs a call process such as communication channel setting or releasing, status management of the macro base station 20, or radio resource management.

Figure 8:
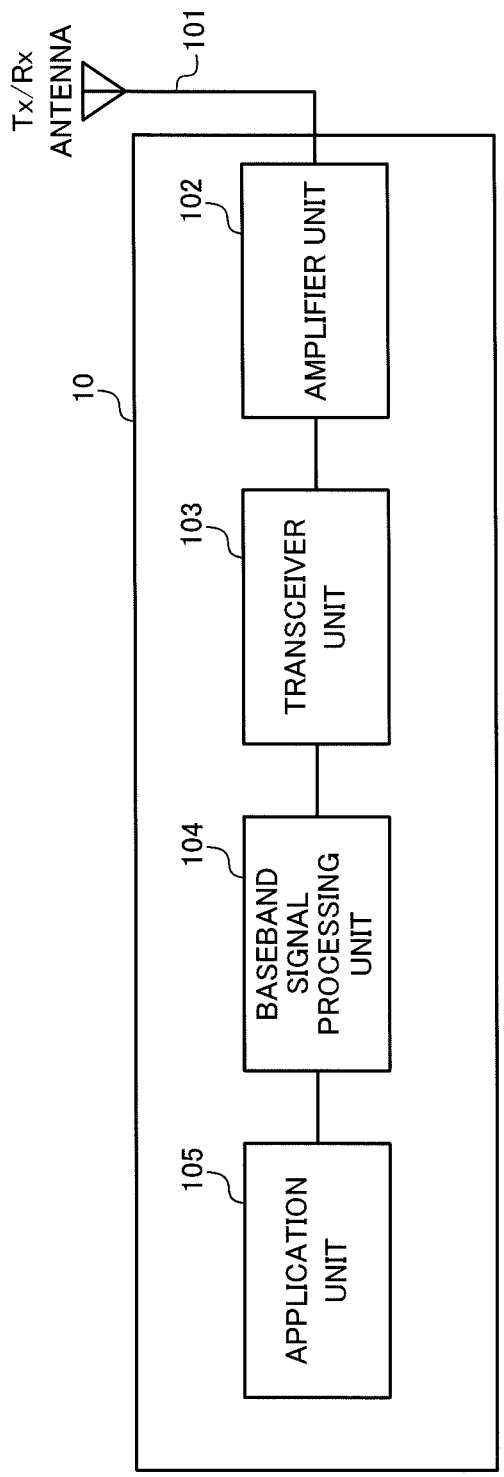
FIG. 8 is a schematic configuration diagram illustrating a mobile terminal apparatus according to an embodiment.

FIG. 8 is a schematic configuration diagram illustrating the macro mobile station 10 according to the present embodiment. The pico mobile station 11 has the same basic configuration as that of the macro mobile station 10 and includes elements illustrated in FIG. 8. While a configuration of the macro mobile station 10 will be described hereinafter, it may be similarly applied to a configuration of the pico mobile station 11.

The macro mobile station 10 includes a Tx/Rx antenna 101, an amplifier unit 102, a transceiver unit 103, a baseband signal processing unit 104, and an application unit 105. At the time of signal receiving, the radio frequency signal received by the Tx/Rx antenna 101 is amplified by the amplifier unit 102, and its frequency is converted by the transceiver unit 103 into a baseband signal. The baseband signal is subjected to the FFT process, error correction decoding, the receive process of retransmission control, and the like by the baseband signal processing unit 104. The downlink user data out of the downlink data are transmitted to the application unit 105. The application unit 105 performs a process for a physical layer or upper layers over the MAC layer, and the like. In addition, out of the downlink data, the broadcast information is also transmitted to the application unit 105. Meanwhile, at the time of transmission, uplink user data are input to the baseband signal processing unit 104 from the application unit 105. The baseband signal processing unit 104 performs a transmission process of retransmission control (hybrid ARQ (H-ARQ)), channel coding, a DFT process, an IFFT process, and the like and transmits the resultant signal to the transceiver unit 103. The transceiver unit 103 performs a frequency conversion process for converting the baseband signal output from the baseband signal processing unit 104 into a radio frequency band, and the resultant signal is amplified by the amplifier unit 102 and is transmitted by the Tx/Rx antenna 101.

Figure 9:
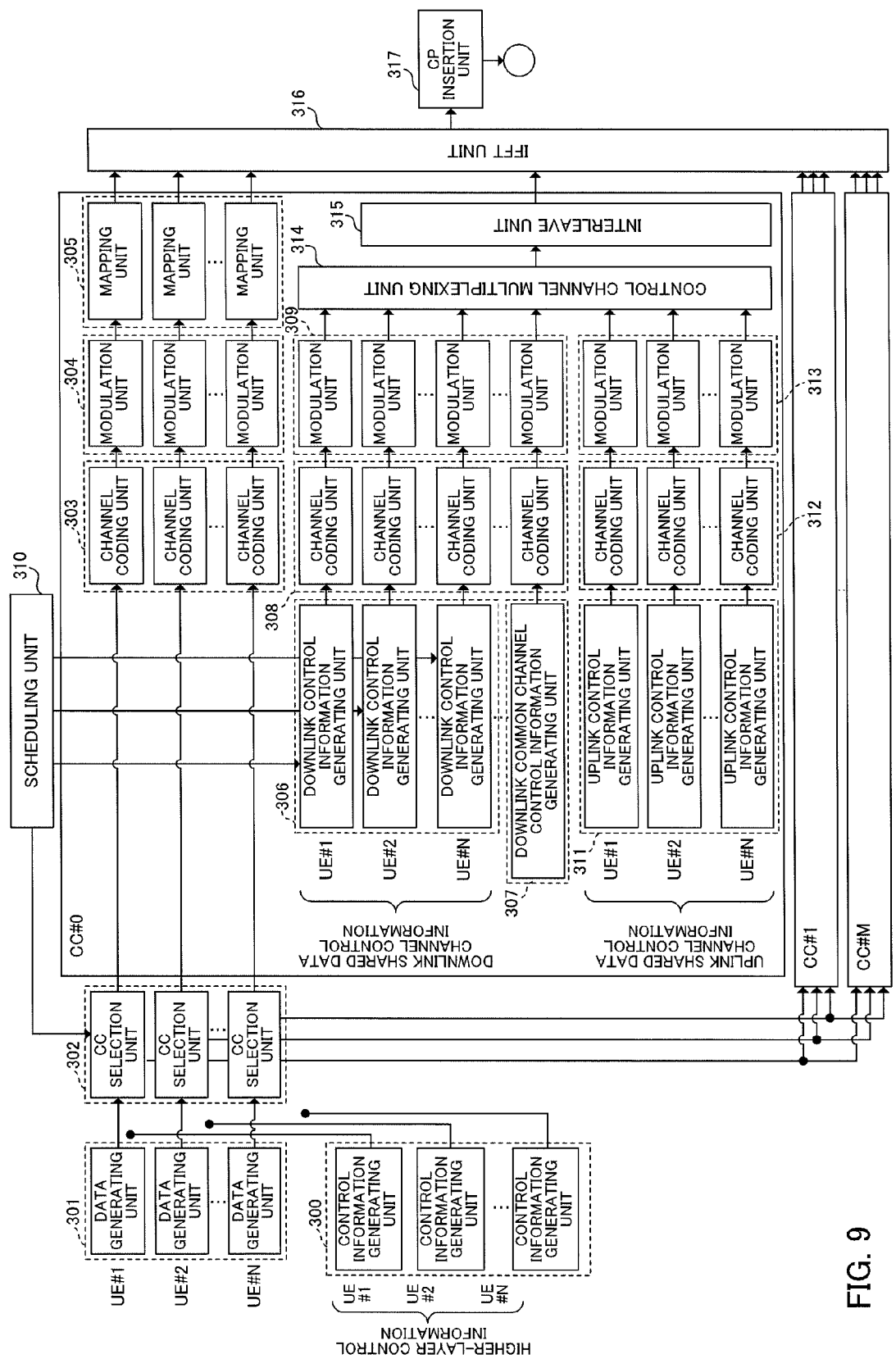
FIG. 9 is a functional block diagram illustrating a transmission processing unit in a baseband signal processing unit of a base station apparatus according to an embodiment.

FIG. 9 is a functional block diagram illustrating a baseband signal processing unit 204 of the macro base station 20 according to the present embodiment and a part of the higher layers, in which the baseband signal processing unit 204 is illustrated by focusing on a functional block of the transmission processing unit. FIG. 9 illustrates a base station configuration capable of processing M component carriers CC1 to CCM at maximum by way of example. The transmit data for the macro mobile station 10 in coverage of the macro base station 20 are transmitted to the macro base station 20 from the higher-layer station apparatus 30.

The control information generating unit 300 generates the higher-layer control signal used in higher layer signaling (e.g., RRC signaling) on a user basis. The higher-layer control signal may include a command for requiring addition/reduction of the component carriers CC.

The data generating unit 301 outputs the transmit data transmitted from the higher-layer station apparatus 30 as user data for each user.

The component carrier selection unit 302 selects the component carrier used in radio communication with the mobile station 10 for each user. As described above, addition/reduction of the component carriers is notified through the RRC signaling from the base station 20 to the mobile station 10, and a complete message is received from the mobile station 10. By receiving the complete message, allocation (addition/reduction) of the component carriers to the corresponding user is confirmed. The confirmed allocation of the component carrier is set in the component carrier selection unit 302 as allocation information of the component carrier. The higher-layer control signal and the transmit data are assigned to the channel coding unit 303 of the corresponding component carrier depending on the allocation information of the component carrier set in the component carrier selection unit 302 for each user.

The scheduling unit 310 controls allocation of the component carrier to the subordinate mobile stations 10 depending on communication quality of the entire system band. The scheduling unit 310 determines addition/reduction of the component carriers allocated to communication with the mobile station 10. The determination result regarding addition/reduction of the component carriers is notified to the control information generating unit 300. In uplink scheduling, either SC-FDMA or clustered DFT-spread OFDM is controlled dynamically (for each subframe). In the component carrier (uplink) where the clustered DFT-spread OFDM is applied, the cluster number and the cluster resource are determined.

The scheduling unit 310 controls the resource allocation in each of the component carriers CC1 to CCM. The scheduling is performed by discriminating between the LTE user terminal and the LTE-A user terminal. The scheduling unit 310 receives the retransmission instruction and the transmit data from the higher-layer station apparatus 30 and also receives CQI of the resource block or the channel estimation value from the receiver unit which measures the uplink receive signal. The scheduling unit 310 performs scheduling of downlink allocation information, uplink allocation information, and the uplink/downlink shared channel signal by referencing the retransmission instruction, the channel estimation value, and the CQI input from the higher-layer station apparatus 30. Propagation paths of mobile communication experience different fluctuation depending on a frequency due to frequency selective fading. In this regard, a resource block having excellent communication quality is allocated to each mobile station 10 for each subframe when the user data are transmitted to the mobile station 10 (this is called adaptive frequency scheduling). In the adaptive frequency scheduling, a mobile station 10 having excellent propagation path quality is selected, and each resource block is allocated to that mobile station 10. For this reason, the scheduling unit 310 allocates the resource block capable of throughput improvement using the CQI for each resource block fed back from each mobile station 10. In uplink where clustered DFT-spread OFDM is applied, the resource block is allocated to each cluster. In addition, MCS (including a coding rate and a modulation scheme) satisfying a predetermined block error rate is determined using the allocated resource block. Parameters satisfying MCS (including a coding rate and a modulation scheme) determined by the scheduling unit 310 are set in the channel coding units 303, 308, and 312 and the modulation units 304, 309, and 313.

The baseband signal processing unit 204 includes channel coding units 303, modulation units 304, and mapping units 305 corresponding to the maximum user multiplexing number N within a single component carrier. The channel coding unit 303 performs channel-coding of the shared data channel (PDSCH) including the user data output from the data generating unit 301 (including a part of the higher-layer control signals) for each user. The modulation unit 304 modulates the channel-coded user data for each user. The mapping unit 305 maps the modulated user data to radio resources.

In addition, the baseband signal processing unit 204 includes a downlink control information generating unit 306 that generates downlink shared data channel control information which is user-specific downlink control information and a downlink common channel control information generating unit 307 that generates downlink common control channel control information which is downlink control information common to users.

The downlink allocation information conforming to DCI Format 1 is the downlink shared data channel control information. The downlink control information generating unit 306 generates downlink allocation information (for example, DCI Format 1) from resource allocation information, MCS information, HARQ information, a transmission power control command of PUCCH, and the like determined for each user. DCI Format 1 is arranged in a search space determined according to the LTE specification. In addition, in a case where CFI and the component carrier number (CC index) are jointly coded according to the joint coding table described below, joint coding information (CC+CFI) may be added to DCI Format 1.

The baseband signal processing unit 204 includes the channel coding units 308 and the modulation units 309 corresponding to the maximum user multiplexing number N within a single component carrier. The channel coding unit 308 performs channel coding of the control information generated by the downlink control information generating unit 306 and the downlink common channel control information generating unit 307 for each user. The modulation unit 309 modulates the channel-coded downlink control information.

In addition, the baseband signal processing unit 204 includes an uplink control information generating unit 311 that generates uplink shared data channel control information serving as control information for controlling the uplink shared data channel (PUSCH) for each user, a channel coding unit 312 that performs channel coding of the generated uplink shared data channel control information for each user, and a modulation unit 313 that modulates the channel-coded uplink shared data channel control information for each user.

Uplink allocation information conforming to DCI Format 0 is the uplink shared data channel control information. The uplink control information generating unit 311 generates uplink allocation information based on uplink resource allocation information (cluster), MCS information and redundancy version (RV), an identifier (new data indicator) for identifying new data or retransmission data, transmission power control command (TPC) of PUSCH, a cyclic shift of the demodulation reference signal (CS for DMRS), a CQI request, and the like determined for each user. In the subframe (component carrier) for which SC-FDMA is selected as the uplink radio access scheme, uplink allocation information of DCI Format 0 is generated according to the LTE specification. In a case where CFI and CC indices are jointly coded based on the joint coding table, the joint coding information (CC+CFI) may be added to DCI Format 0.

The control information modulated by the modulation units 309 and 313 for each user is multiplexed by the control channel multiplexing unit 314, and further, interleaved by the interleave unit 315. The control signal output from the interleave unit 315 and the user data output from the mapping unit 305 are input to the IFFT unit 316 as a downlink channel signal. The IFFT unit 316 performs inverse fast Fourier transform of the downlink channel signal to transform the frequency domain signal to the time series signal. The cyclic prefix insertion unit 317 inserts the cyclic prefix into the time series signal of the downlink channel signal. In addition, the cyclic prefix serves as a guide interval for absorbing a difference of the multi-path propagation delay. The transmit data having the cyclic prefix is transmitted to the transceiver unit 203.

In addition, similar to the macro base station 20, the pico base station 21 has a functional block configuration as illustrated in FIGS. 7 and 9. In a case where it is necessary to discriminate between the macro base station 20 and the pico base station 21, a subscript M is used to denote the macro side, and a subscript P is used to denote the pico side in reference symbols of each functional block. In a case where it is not necessary to discriminate between the macro base station 20 and the pico base station 21, the reference symbols of FIGS. 7 and 9 are commonly used.

Figure 10:
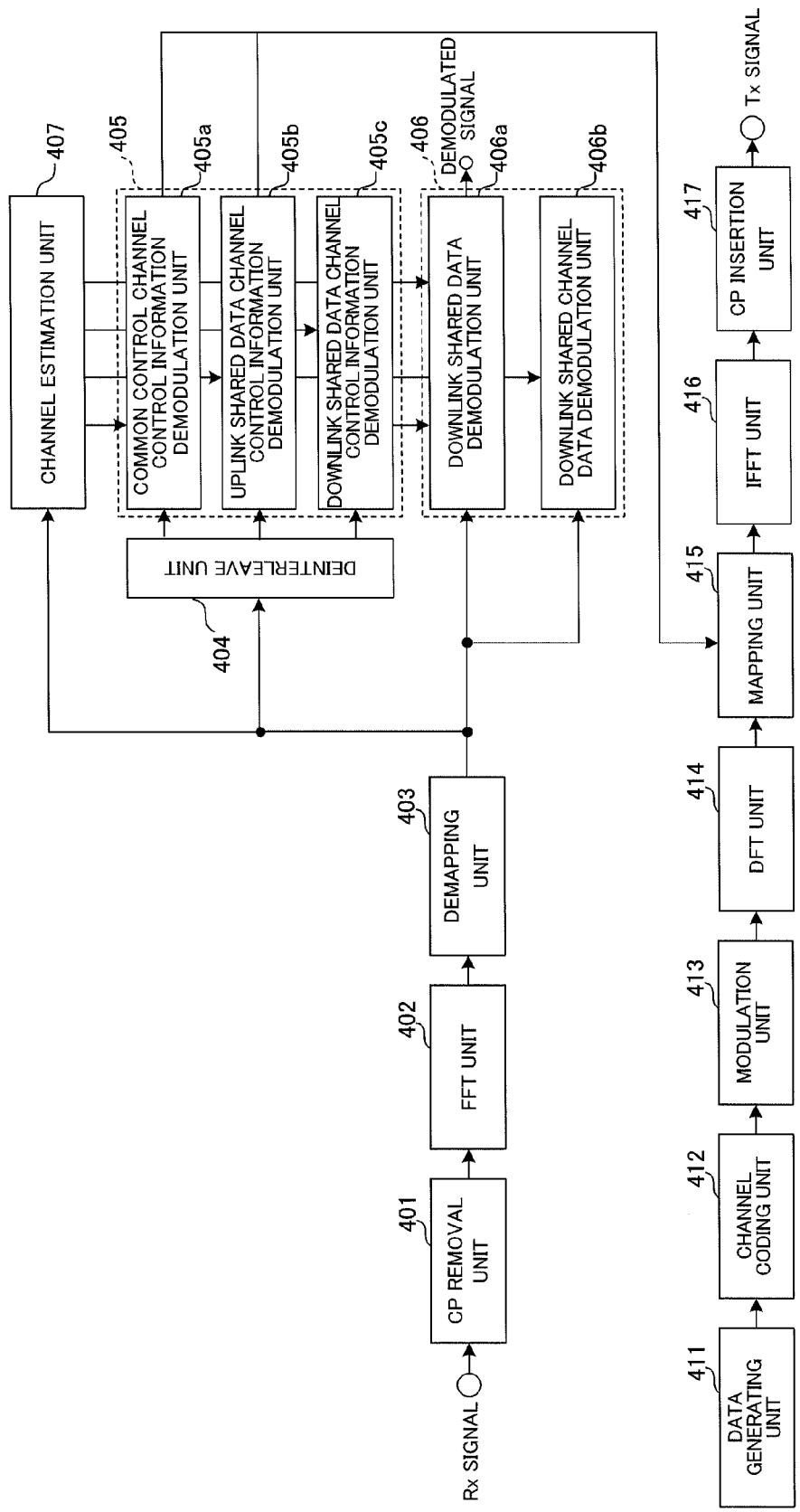
FIG. 10 is a functional block diagram illustrating a baseband signal processing unit of the mobile terminal apparatus according to an embodiment.

FIG. 10 is a functional block diagram illustrating the baseband signal processing unit 104 of the macro mobile station 10 as a functional block of the LTE-A terminal for supporting LTE-A. First, a downlink configuration of the macro mobile station 10 will be described.

Out of the downlink signal received as the receive data from the macro base station 20, the cyclic prefix CP is removed using the CP removal unit 401. The CP-removed downlink signal is input to the FFT unit 402. The FFT unit 402 performs fast Fourier transform (FFT) of the downlink signal to transform the time domain signal to the frequency domain signal, which is input to the demapping unit 403. The demapping unit 403 performs demapping of the downlink signal to extract the user data, the higher-layer control signal, and the multiplexed control information obtained by multiplexing the downlink signal to a plurality of pieces of control information. The demapping process of the demapping unit 403 is performed based on the higher-layer control signal input from the application unit 105. The multiplexed control information output from the demapping unit 403 is deinterleaved by the deinterleave unit 404.

The baseband signal processing unit 104 includes a control information demodulation unit 405 that demodulates the control information, a data demodulation unit 406 that demodulates the downlink shared data, and a channel estimation unit 407. The control information demodulation unit 405 includes a common control channel control information demodulation unit 405*a* that demodulates the downlink common control channel control information from the downlink control channel, an uplink shared data channel control information demodulation unit 405*b* that demodulates the uplink shared data channel control information by performing blind decoding of the search space from the downlink control channel, and a downlink shared data channel control information demodulation unit 405*c* that demodulates the downlink shared data channel control information by performing blind decoding of the search space from the downlink control channel. The data demodulation unit 406 includes a downlink shared data demodulation unit 406*a* that demodulates the user data and the higher-layer control signal and a downlink shared channel data demodulation unit 406*b* that demodulates the downlink shared channel data.

The common control channel control information demodulation unit 405*a* extracts common control channel control information which is control information common to users through a blind decoding process, a demodulation process, a channel decoding process, and the like for the common search space of downlink control channel (PDCCH). The common control channel control information contains the downlink channel quality information (CQI) and is input to the mapping unit 115 described below, so that it is mapped as a part of the transmit data to the macro base station 20.

The uplink shared data channel control information demodulation unit 405*b* extracts uplink shared data channel control information which is user-specific uplink allocation information through a blind decoding process, a demodulation process, a channel decoding process, and the like for the user-specific search space of the downlink control channel (PDCCH). The uplink allocation information is used in control of the uplink shared data channel (PUSCH) and is input to the downlink common channel data demodulation unit 406*b*.

The downlink shared data channel control information demodulation unit 405*c* extracts the downlink shared data channel control information which is user-specific downlink control signal through a blind decoding process, a demodulation process, a channel decoding process, and the like for the user-specific search space of the downlink control channel (PDCCH). The downlink shared data channel control information is used in control of the downlink shared data channel (PDSCH) and is input to the downlink shared data demodulation unit 406.

The downlink shared data channel control information demodulation unit 405*c* performs a blind decoding process of the user-specific search space based on the information regarding PDCCH and PDSCH included in the higher-layer control signal demodulated by the downlink shared data demodulation unit 406*a*. The information regarding the user-specific search space (which may include ON/OFF of activation/deactivation of PDSCH/PDCCH) is signaled by the higher-layer control signal.

The downlink shared data demodulation unit 406*a* obtains user data or higher-layer control information based on the downlink shared data channel control information input from the downlink shared data channel control information demodulation unit 405*c*. The higher-layer control information (including mode information) is output to the channel estimation unit 407. The downlink common channel data demodulation unit 406*b* demodulates the downlink common channel data based on the uplink shared data channel control information input from the uplink shared data channel control information demodulation unit 405*b*.

The channel estimation unit 407 performs channel estimation using the common reference signal. The estimated channel fluctuation is output to the common control channel control information demodulation unit 405a, the uplink shared data channel control information demodulation unit 405b, the downlink shared data channel control information demodulation unit 405c, and the downlink shared data modulation unit 406a. In such modulation units, the downlink allocation information is demodulated using the estimated channel fluctuation and the demodulation reference signal.

The baseband signal processing unit 104 includes, as a functional block of the transmission processing system, a data generating unit 411, a channel coding unit 412, a modulation unit 413, a DFT unit 414, a mapping unit 415, an IFFT unit 416, and a CP insertion unit 417. The data generating unit 411 generates the transmit data based on the bit data input from the application unit 105. The channel coding unit 412 performs a channel coding process such as error correction for the transmit data, and the modulation unit 413 modulates the channel-coded transmit data based on QPSK and the like. The DFT unit 414 performs discrete Fourier transform of the modulated transmit data. The mapping unit 415 performs mapping of each frequency component of the data symbol subjected to the DFT into subcarrier positions instructed to the base station apparatus. The IFFT unit 416 performs inverse fast Fourier transform of the input data corresponding to the system band to transform to the time series data, and the CP insertion unit 417 inserts the cyclic prefix into the time series data as a data delimiter.

In addition, similar to the macro mobile station 10, the pico mobile station 11 has a functional block configuration as illustrated in FIGS. 8 and 10. In a case where it is necessary to discriminate between the macro mobile station 10 and the pico mobile station 11, a subscript M is used to denote the macro side, and a subscript P is used to denote the pico side in the reference symbols of each functional block. In a case where it is not necessary to discriminate between the macro mobile station 10 and the pico mobile station 11, the reference symbols of FIGS. 8 and 10 are commonly used.

Next, operations of the aforementioned configuration according to the present embodiment will be described in detail.

The macro mobile station $10_2$ subordinate to the macro base station 20 of FIG. 6 corresponds to the MACRO_UE2 of FIG. 3, and the pico mobile station $11_2$ subordinate to the pico base station 21 of FIG. 6 corresponds to the PICO_UE2 of FIG. 3. That is, the pico mobile station $11_2$ exists in the cell edge of the picocell 51, and the macro mobile station $10_2$ exists in the vicinity of the cell edge of the picocell 51 near the pico mobile station $11_2$.

It is assumed that the macro base station 20 allocates two component carriers CC1 and CC2 to the macro mobile station $10_2$, and the pico base station 21 allocates the same component carriers CC1 and CC2 as those of the macro side to the pico mobile station $11_2$.

The macro base station 20 and the pico base station 21 adaptively perform CFI control for the macro mobile station $10_2$ and the pico mobile station $11_2$ depending on an environment. In the macro base station 20, the scheduling unit 310 (M) performs cross-carrier scheduling in which CFI indicating the PDSCH initiation positions of CC1 and CC2 from the PDCCH of CC1 is notified to the macro mobile station $10_2$. Meanwhile, in the pico base station 21, the scheduling unit 310(P) performs cross-carrier scheduling in which the CFI indicating the PDSCH initiation positions of CC1 and CC2 from the PDCCH of CC2 is notified to the pico mobile station $11_2$. As illustrated in FIG. 4B, the pico mobile station $11_2$ suffers significant interference from the macro in the radio resource (three OFDM symbols in the leading end of the subframe of CC1) used to transmit PDCCH to the macro mobile station $10_2$. Meanwhile, the CC2 is not used to transmit PDCCH to the macro mobile station $10_2$ by employing the cross-carrier scheduling. As a result, while the pico mobile station $11_2$ suffers significant interference from the macro in the radio resource (three OFDM symbols in the leading end of the subframe of CC1) used to transmit PDCCH to the macro mobile station $10_2$, the pico mobile station $11_2$ suffers no interference from the macro in the radio resource (three OFDM symbols in the leading end of the subframe of CC2) that is not used to transmit PDCCH to the macro mobile station $10_2$. For this reason, the pico base station 21 transmits PDCCH to the pico mobile station $11_2$ using the radio resource (three OFDM symbols from the leading end of the subframe of CC2 at maximum) that is not used to transmit PDCCH to the macro mobile station $10_2$. The CFI indicating the transmit initiation position of the PDSCH of CC1 employs cross-carrier scheduling in which the PDCCH of CC2 is used in notification. As a result, the pico base station 21 can notify the pico mobile station $11_2$ of the CFI indicating the transmit initiation position of the PDSCH of CC1 without using the PDCCH of CC1 which suffers significant interference from the macro.

In this case, according to the present invention, the CFIs of CC1 and CC2 notified to the macro mobile station $10_2$ and the CFIs of CC1 and CC2 notified to the pico mobile station $11_2$ are controlled as described below. Specifically, in the macro mobile station $10_2$, the CFI of CC1 used to transmit PDCCH is dynamically controlled, and the CFI of CC2 that is not used to transmit PDCCH is quasi-statically controlled. As illustrated in FIGS. 5A and 5B, it is preferable that the CFI of CC2 in the macro side be quasi-statically controlled such that the PDCCH of CC2 in the pico side and the PDSCH of CC2 in the macro side are not overlapped based on the number of symbols of the PDCCH of CC2 in the pico side.

As a result, it is possible to implement high transmission efficiency of PDSCH in CC1 because the PDSCH initiation position of CC1 is dynamically controlled in each of the subframes of CFI. In addition, since the CFI for the PDSCH initiation position of CC2 that is not used to transmit PDCCH is quasi-statically controlled with a relatively long period, it is possible to increase the PDSCH transmission efficiency in CC2, compared to a case where the PDSCH initiation position of CC2 is fixed to the position corresponding to the maximum value (three OFDM symbols in the leading end of the subframe of CC2) allocated to PDCCH in the pico side (refer to FIG. 5B).

In the pico mobile station $11_2$, the CFI of CC2 that transmits PDCCH is dynamically controlled, and the CFI of CC1 that is not used to transmit PDCCH is also dynamically controlled. Although the PDSCH initiation position of CC1 in the pico side may be changed to overlap with the PDCCH in the macro side, the influence of the PDSCH of the pico side to the PDCCH of the macro side is limited, so that it can be negligible.

As a result, the CFI is dynamically controlled in each subframe for the PDSCH initiation positions in CC1 and CC2 in the pico side, so that it is possible to implement high transmission efficiency of the PDSCH in CC1 and CC2.

Description will now be made for the processing in the macro base station 20 and the pico base station 21 in order to implement the CFI control described above.

In the macro base station 20 and the pico base station 21, the scheduling unit 310 performs scheduling of the uplink/downlink control signal and the uplink/downlink shared channel signal by referencing the retransmission instruction, the channel estimation value, and the CQI input from the higher-layer station apparatus 30. Propagation paths in mobile communication experience different fluctuation depending on a frequency due to frequency selective fading. In this regard, adaptive frequency scheduling is employed, in which a resource block having excellent communication quality is allocated to each mobile station 10 or 11 for each subframe when the user data are transmitted to the mobile station 10 or 11. In the adaptive frequency scheduling, a mobile station having excellent propagation path quality is selected, and each resource block is allocated to that mobile station 10. For this reason, the scheduling unit 310 allocates the resource block using the CQI for each resource block fed back from each mobile station 10 or 11. In addition, MCS (including a coding rate and a modulation scheme) is determined so as to satisfy a predetermined block error rate in the allocated resource block.

Here, a single or a plurality of component carriers (CC1 to CCM) are dynamically allocated to communication between the mobile stations 10 and 11 at the start of communication or in the middle of communication. In the communication system according to the present embodiment, five component carriers can be simultaneously allocated at maximum. The number of component carriers allocated to the mobile stations 10 and 11 may be determined based on conditions such as a mobile station capability, a current communication quality, and a current data amount. For example, the allocation information of component carriers may be notified to the mobile stations 10 and 11 through RRC signaling. In a case where the cross-carrier scheduling is performed so as to reduce interference in a specific component carrier CC2 to the pico mobile station 11 as illustrated in FIG. 4B, it is necessary that the macro base station 20 obtains information on the pico mobile station 11. However, a method of obtaining the information on the pico mobile station 11 is not particularly limited. For example, the information on the pico mobile station 11 may be obtained from a higher-layer station apparatus 30 which has obtained the information on the pico mobile station 11 from the pico base station 21.

The scheduling unit 310 manages the component carriers allocated to each user (mobile stations 10 and 11). If a plurality of component carriers are allocated to a single user, PDSCHs for transmitting data to corresponding user are reserved for each of the allocated component carriers. In addition, the component carrier for transmitting PDCCH for demodulating the PDSCH reserved in the component carrier is selected out of the component carriers allocated to the corresponding user. As a result, in a case where PDCCH is transmitted using a component carrier different from the component carrier used to transmit PDSCH (cross-carrier scheduling), the CC index (carrier indicator) used to transmit PDSCH is determined. The carrier indicator may be instructed from a higher layer to the scheduler 220 or may be determined using the joint coding table.

The carrier indicator for specifying the component carrier used to transmit PDSCH and the CFI value indicating the number of symbols allocated to the control channel area in the same subframe as that of the corresponding PDSCH are supplied to the downlink control information generating unit 306 and the uplink control information generating unit 311.

In the downlink control signal scheduling, it is determined how many symbols from the leading end OFDM symbol of each subframe are allocated to the control channel area. The scheduling unit 310 determines an optimal number of OFDM symbols (CFI value) depending on the cell coverage, the allowable number of users, and the like.

According to the present invention, the scheduling unit 310(M) of the macro base station 20 dynamically controls the CFI of CC1 for the macro mobile station 10₂ and quasi-statically controls the CFI of CC2. Specifically, the CFI of CC2 for the macro mobile station 10₂ is quasi-statically controlled depending on the CFI of CC2 for the pico mobile station 11₂ in the pico side. As illustrated in FIG. 5A, if the CFI of CC2 for the pico mobile station 11₂ has three OFDM symbols, the CFI of CC2 for the macro mobile station 10₂ is controlled to have three OFDM symbols. As illustrated in FIG. 5B, if the CFI of CC2 for the pico mobile station 11₂ has a single OFDM symbol, the CFI of CC2 for the macro mobile station 10₂ is controlled to have a single OFDM symbol. In this manner, at the time of cross-carrier scheduling, the CFI of CC that is not used to transmit PDCCH is quasi-statically controlled to have the same CFI value as the CFI allocated to the pico mobile station 11 suffering interference in the pico side. In addition, the CFI allocated to the pico mobile station 11 suffering interference in the pico side may be notified from the pico base station 21 or the higher-layer station apparatus 30. Not the CFI of itself allocated to the pico mobile station 11 but the number of pico mobile stations 11 existing in the picocell 51 may be notified. The CFI allocated to the pico mobile station 11 may be estimated from the number of pico mobile stations 11 existing in the picocell 51.

The scheduling unit 310(M) allocates the CFI of CC1 dynamically controlled for the macro mobile station 10₂ to the downlink control information generating unit 306(M) and the uplink control information generating unit 311(M) corresponding to the CC1 and allocates the CFI of CC2 quasi-statically controlled with a period sufficiently longer than that of the subframe to the downlink control information generating unit 306(M) and the uplink control information generating unit 311(M) corresponding to the CC2.

In the baseband signal processing unit 204 corresponding to CC1, the downlink control information generating unit 306(M) that generates control information for the macro mobile station 10₂ generates PDCCH multiplexed with a physical control format indicator channel (PCFICH) and a physical hybrid ARQ indicator channel (PHICH) transmitted on the CC1 as the downlink allocation information (DCI Format 1). The CFI transmitted on PCFICH is updated for each subframe in response to the instruction from the scheduling unit 310(M).

In the baseband signal processing unit 204 corresponding to CC2 that is not used to transmit PDCCH, the downlink control information generating unit 306(M) that generates the control information for the macro mobile station 10₂ generates the downlink allocation information (DCI Format 1) of the CC2. The CFI contained in the downlink allocation information (DCI Format 1) of CC2 is updated with a long period corresponding to a plurality of subframes in response to an instruction from the scheduling unit 310(M) (quasi-static control of CFI). The downlink allocation information of CC2 (DCI Format 1) is transmitted to the baseband signal processing unit 204 corresponding to CC1 and is input to the downlink control information generating unit 306(M) that generates the downlink allocation information of CC1 for the macro mobile station 10₂. In the downlink control information generating unit 306(M), the downlink allocation information of CC1 and the downlink allocation information of CC2 are controlled such that they are arranged in PDCCH of CC1 as illustrated in FIG. 2B.

The information indicating which component carrier corresponds to PDSCH demodulated using the downlink allocation information may be called a carrier indicator field (hereinafter, referred to as CIF). It is possible to identify the CC relating to the downlink allocation information in a mobile station by adding the CIF to the downlink allocation information. Since a separate field is reserved to set the CIF bit in the DCI format, the number of bits increases.

Here, description will be made for joint coding of CFI and CC. FIG. 11 illustrates a joint coding table for jointly coding CC and CFI. The base stations 20 and 21 and the mobile stations 10 and 11 store the same joint coding table, and the CC index and the CFI are jointly coded/decoded using the joint coding table. In FIG. 11, a combination of the component carrier and the CFI is jointly coded by setting the maximum number of component carriers to 5 and setting the CFI to 1, 2, or 3. For example, the CIF bit width may be set to 3. In a case where the CIF bit width is set to 3, it may be short depending on the number of component carriers. If the number of CCs is 2 or 3, 3 bits may be affordable. However, if the number of CCs is 4 or 5, 4 bits are necessary, which is short. If the number of CIF bits is set to 4, it may be affordable. However, in terms of suppression of the number of bits, the joint coding table illustrated in FIG. 11 may be used. As illustrated in FIG. 11, if the number of CCs is 4, CFI=N (undefined) is set for CC4 having the greatest component carrier number. In addition, if the number of CCs is 5, CFI=N (undefined) is set for CC4 and CC5. In the case of CFI=N, the value of CFI=N is quasi-statically notified to the mobile station through RRC signaling.

Figure 12:
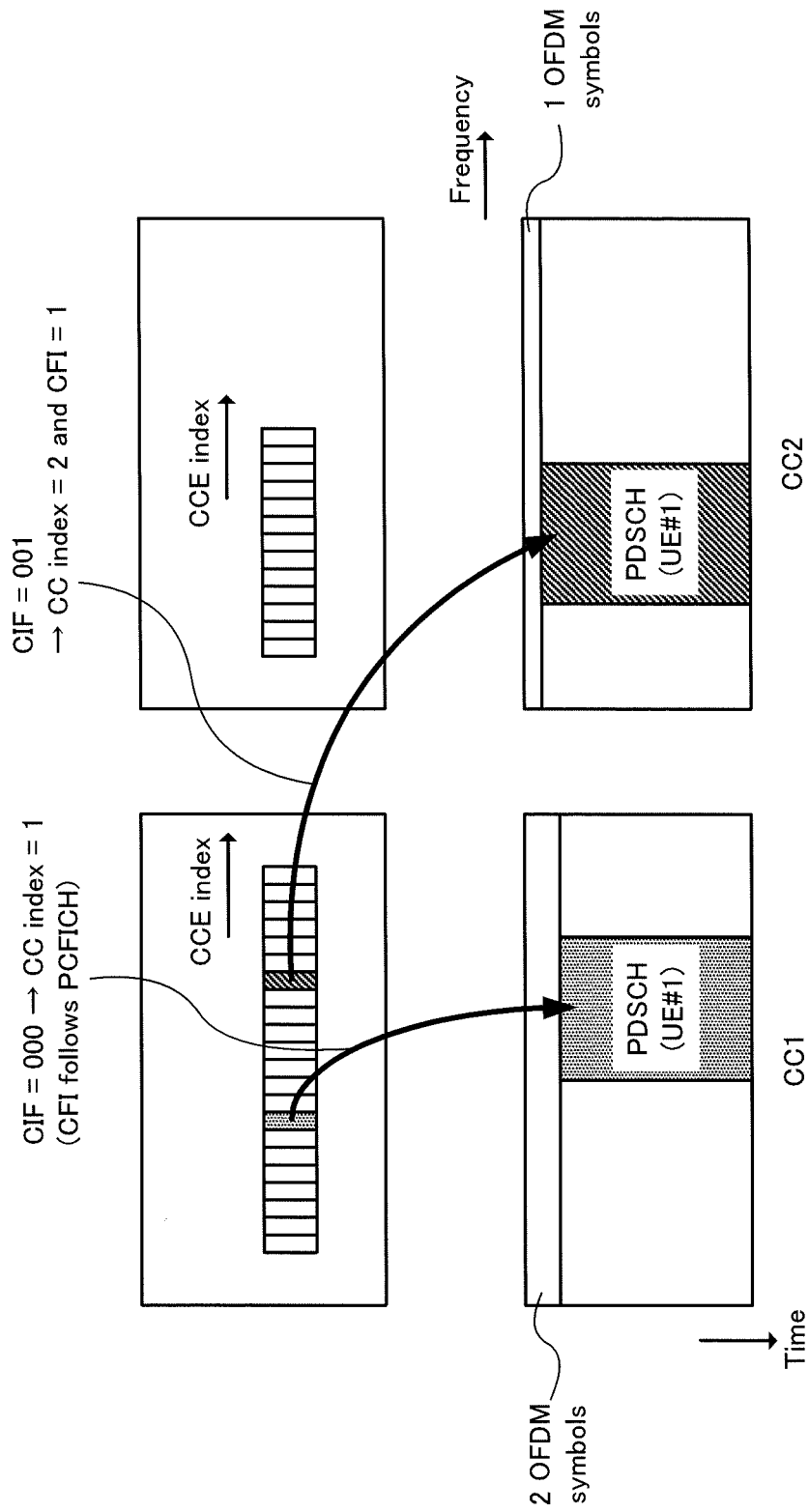
FIG. 12 is a conceptual diagram for a case where CIF is notified using the joint coding table by setting the number of CCs to 2.

FIG. 12 illustrates a specific example of the CIF notification in a case where the number of CCs is set to 2. Since CIF=000 is notified for CC1, the CC index is set to 1. The CFI is transmitted on PCFICH. Since CIF=001 is notified for CC2, the CC index is set to 2, and CFI is set to 1.

Figure 13:
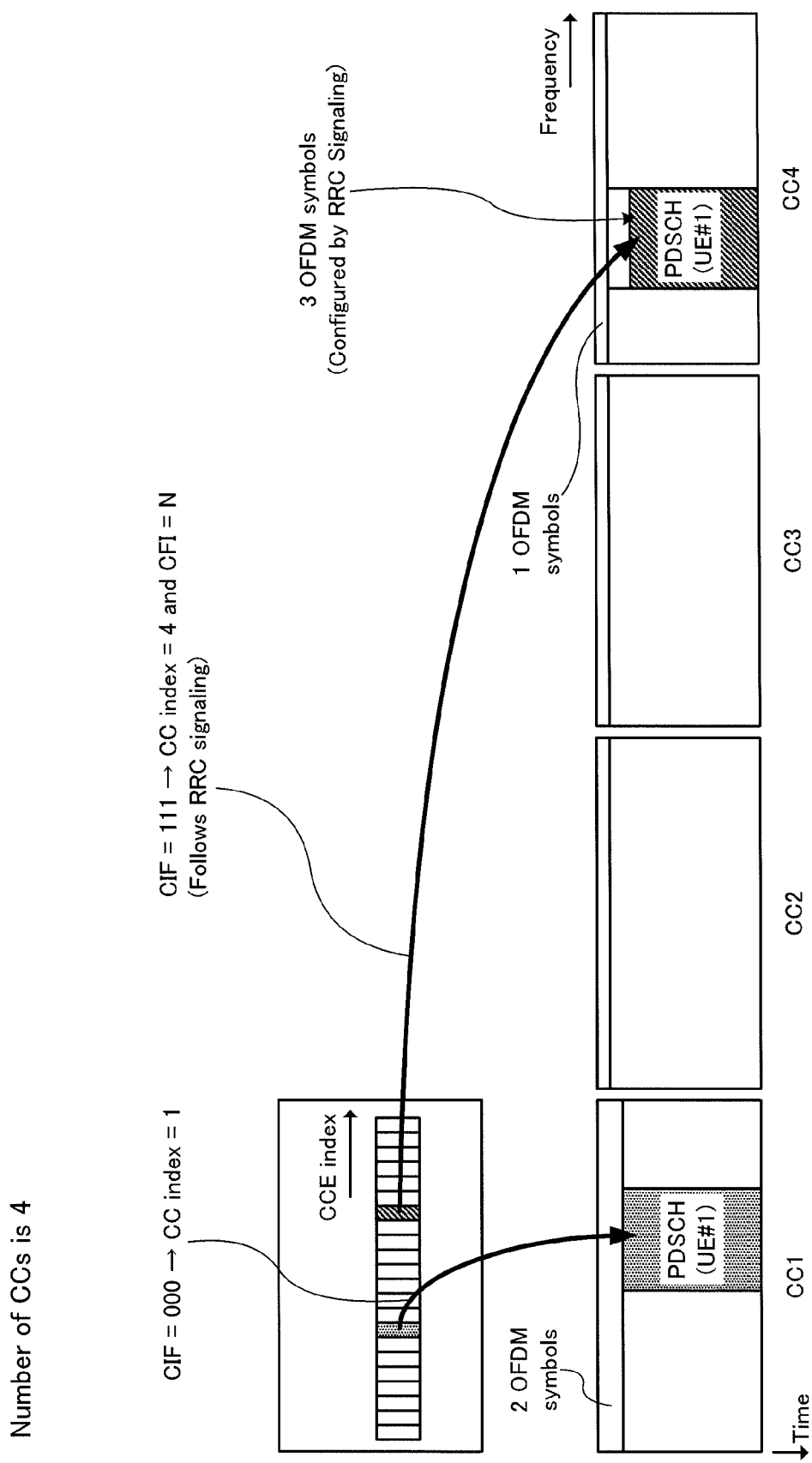
FIG. 13 is a conceptual diagram for a case where CIF is notified using the joint coding table by setting the number of CCs to 4.

FIG. 13 illustrates a specific example of the CIF notification in a case where the number of CCs is set to 4. Since CIF=000 is notified for CC1, the CC index is set to 1, and the CFI is transmitted on PCFICH. Since CIF=111 is notified for CC4, the CC index is set to 3, and the CFI is set to N. The numerical value of CFI (=N) is quasi-statically notified through RRC signaling.

In the pico base station 21, cross-carrier scheduling is applied to the pico mobile station $11_2$. The scheduling unit 310(P) of the pico base station 21 dynamically controls the CFI of CC2 used to transmit PDCCH to the pico mobile station $11_2$ and also dynamically controls the CFI of CC1 that is not used to transmit PDCCH. The pico base station 21 controls the CFI of CC2 based on the number of pico mobile stations 11. For example, if the number of pico mobile stations 11 is large, the CFI is controlled such that three OFDM symbols are allocated to PDCCH of CC2 for the pico mobile station $11_2$ as illustrated in FIG. 5A. In addition, if the number of pico mobile stations 11 is small, the CFI is controlled such that a single OFDM symbol (or two OFDM symbols) is allocated to PDCCH of CC2 for the pico mobile station $11_2$ as illustrated in FIG. 5B.

Other operations are basically similar to those of the cross-carrier scheduling in the macro base station 20 except that the pico base station 21 also dynamically controls the CFI of CC1 that is not used to transmit PDCCH to the pico mobile station $11_2$.

In the mobile stations 10 and 11, the deinterleave unit 404 deinterleaves the PDCCH mapped to first to third OFDM symbols in the leading end of subframe. In the case of the macro mobile station $10_2$, the downlink shared data channel control information demodulation unit 405c obtains CFI by demodulating PCFICH multiplexed to the OFDM symbol(s) in the leading end of the subframe of CC1 and demodulates the downlink allocation information (DCI) from the OFDM symbol range specified in the CFI. Since cross-carrier scheduling is employed in the macro mobile station $10_2$, the downlink allocation information (DCI) for demodulating PDSCH of CC1 and the downlink allocation information (DCI) for demodulating PDSCH of CC2 are demodulated from the PDCCH of CC1. In this case, in a case where CC and CFI are jointly coded, the CFI and the CC index corresponding to the CI are decoded using the joint coding table illustrated in FIG. 11. In the example of FIG. 12, CIF=000 is demodulated. Therefore, CC index=1 is decoded for the CC1, and the CFI is notified on PCFICH. This CFI is dynamically controlled on a subframe basis. Meanwhile, since CIF=001 is demodulated from the downlink allocation information (DCI) of CC2, CC index=2 and CFI=1 are decoded. This CFI is quasi-statically controlled with a long period. This is similarly applied to the uplink shared data channel control information demodulation unit 405b.

The downlink shared data demodulation unit 406a, in the CC1, obtains the PDSCH initiation position from the CFI notified on PCFICH of CC1 and performs demodulation from the leading end of PDSCH. In addition, in the CC2, the PDSCH initiation position is obtained from the CFI decoded from the downlink allocation information (DCI) of CC2 and performs demodulation from the leading end of PDSCH.

In the pico mobile station $11_2$, similar to the macro mobile station $10_2$, the CFI of C2 and the CFI of CC1 are obtained from the PDCCH of CC2, and the PDSCH is demodulated from CC1 and CC2.

In the description above, cross-carrier scheduling is performed for the mobile stations 10 and 11 depending on a relationship between the macro mobile station 10 of the macrocell 50 and the pico mobile station 11 of the picocell 51. However, the CFI control may be applied to a relationship between neighboring cells.

INDUSTRIAL APPLICABILITY

The present invention may be applicable to a communication system that performs cross-carrier scheduling so as to alleviate interference between a mobile station existing in one of the cells and a mobile station existing in another cell and suffering interference from the one of the cells.

This application is based on and claims priority to Japanese Unexamined Patent Application No. 2010-114382, filed on May 18, 2010, the entire content of which is incorporated herein by reference.

The invention claimed is:

1. A radio communication system comprising:
a first base station that forms a first cell; and
a second base station that forms a second cell overlapping with at least a part of the first cell,
wherein,
in a case where communication between subordinate terminals is performed using a plurality of fundamental frequency blocks, the first base station transmits first resource information indicating a data channel initiation position in one of the fundamental frequency blocks, and second resource information indicating a data channel initiation position in the other fundamental frequency block through a control channel of the one of the fundamental frequency block, the first resource information is dynamically controlled, and the second resource information is quasi-statically controlled,
in a case where communication between subordinate terminals existing in positions where there is interference from the first cell within the second cell is performed using the one and the other fundamental frequency blocks, the second base station transmits third resource information indicating a data channel initiation position in the other fundamental frequency block and fourth resource information indicating a data channel initiation position in the one of the fundamental frequency block through a control channel of the other fundamental frequency block, and the third resource information and the fourth resource information are dynamically controlled, the first base station controls the second resource information such that the data channel initiation position in the other fundamental frequency block occurs before the data channel initiation position in the one fundamental frequency block while the number of control channel symbols allocated by the second base station to the subordinate terminal in the other fundamental frequency block is smaller than a maximum number of symbols, and the number of control channel symbols are estimated from the number of subordinate terminals existing in the second cell.

2. The radio communication system according to claim 1, wherein the first cell is a macrocell larger than the second cell, and the second cell is a picocell which is included in the first cell or fills a part of the first cell.

3. The radio communication system according to claim 1, wherein the first base station controls the first resource info cation in every subframe serving as a transmission time interval and controls the second resource information with a period longer than that of the subframe.

* * * * *